(12) United States Patent
Jimenez et al.

(10) Patent No.: US 12,563,249 B2
(45) Date of Patent: Feb. 24, 2026

(54) APPARATUS AND METHOD FOR GENERATING A STREAM-RECOMMENDATION

(71) Applicant: Sony Interactive Entertainment Inc., Tokyo (JP)

(72) Inventors: Daniel Israel Pereira Jimenez, London (GB); Daniel Goldman, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/662,373

(22) Filed: May 13, 2024

(65) Prior Publication Data

US 2024/0388750 A1 Nov. 21, 2024

(30) Foreign Application Priority Data

May 18, 2023 (GB) .................................. 2307448.7

(51) Int. Cl.
| | |
|---|---|
| *H04N 21/25* | (2011.01) |
| *A63F 13/86* | (2014.01) |
| *H04N 21/218* | (2011.01) |
| *H04N 21/2187* | (2011.01) |
| *H04N 21/4223* | (2011.01) |
| *H04N 21/433* | (2011.01) |

(52) U.S. Cl.
CPC ........... *H04N 21/251* (2013.01); *A63F 13/86* (2014.09); *H04N 21/21805* (2013.01); *H04N 21/2187* (2013.01); *H04N 21/4223* (2013.01); *H04N 21/4334* (2013.01)

(58) Field of Classification Search
CPC ........... H04N 21/251; H04N 21/21805; H04N 21/2187; H04N 21/4223; H04N 21/4334; A63F 13/86
See application file for complete search history.

(56) References Cited

U.S. PATENT DOCUMENTS

| | | | |
|---|---|---|---|
| 10,554,596 B1 * | 2/2020 | Fish ...................... | H04L 51/046 |
| 11,106,328 B1 * | 8/2021 | Holland ................ | G06F 3/0304 |
| 2022/0203228 A1 * | 6/2022 | Wiggeshoff ............. | A63F 13/86 |

FOREIGN PATENT DOCUMENTS

WO 2017030844 A1 2/2017

OTHER PUBLICATIONS

Combined Search and Examination Report for corresponding Application No. GB2307448.7, 9 pages, dated Nov. 10, 2023.

* cited by examiner

*Primary Examiner* — Alazar Tilahun
(74) *Attorney, Agent, or Firm* — Kilpatrick Townsend & Stockton LLP

(57) ABSTRACT

An apparatus includes communication circuitry and processing circuitry. The communication circuitry is configured to receive, from a requesting device, a stream-recommendation request associated with a player profile, and the processing circuitry responsive to the stream-recommendation request to select, from a list of available game streams, one or more available game streams. The processing circuitry is configured to generate a stream recommendation indicating the selected one or more available game streams. The processing circuitry is configured to select the one or more available game streams in dependence on the player profile.

20 Claims, 16 Drawing Sheets

302
Receive, from requesting device, stream-recommendation request

304
Select one or more available game streams based on player profile

306
Generate stream recommendation

302
Receive, from requesting device, stream-recommendation request

702
Identify player preferences and/or skill level indicated in player profile

704
Select one or more available game streams based on game preferences and/or skill level 306
Generate stream recommendation 1002
Receive, from requesting device, stream-selection signal indicating a selected game stream 1004
Make selected game stream available to requesting device

APPARATUS AND METHOD FOR GENERATING A STREAM-RECOMMENDATION

BACKGROUND

The present technique relates to the field of video game live streaming.

In video game live streaming, a player broadcasts their game, as they play it, to viewers. Viewers can stream the broadcast to a device to view the player's gameplay in real time (e.g. live). Optionally, the player may also broadcast the audio recorded by a microphone (e.g. so that the player can provide an audio commentary as they play the game), and may further broadcast images recorded by a camera (e.g. a video of themselves playing the game) to be displayed alongside images from the game.

However, it can sometimes be difficult for a broadcasting player to find people to broadcast a game to, or for a streaming player (viewer) to find people to stream a game from. For example, this may be the case if a user plays a game which no one they know plays. Examples of the present technique aim to address this problem.

SUMMARY

Examples of the present technique are set out in the claims.

BRIEF DESCRIPTION OF THE DRAWING

Embodiments of the present technique will now be described by way of example with reference to the accompanying drawings, in which.

DETAILED DESCRIPTION

Figure 1:
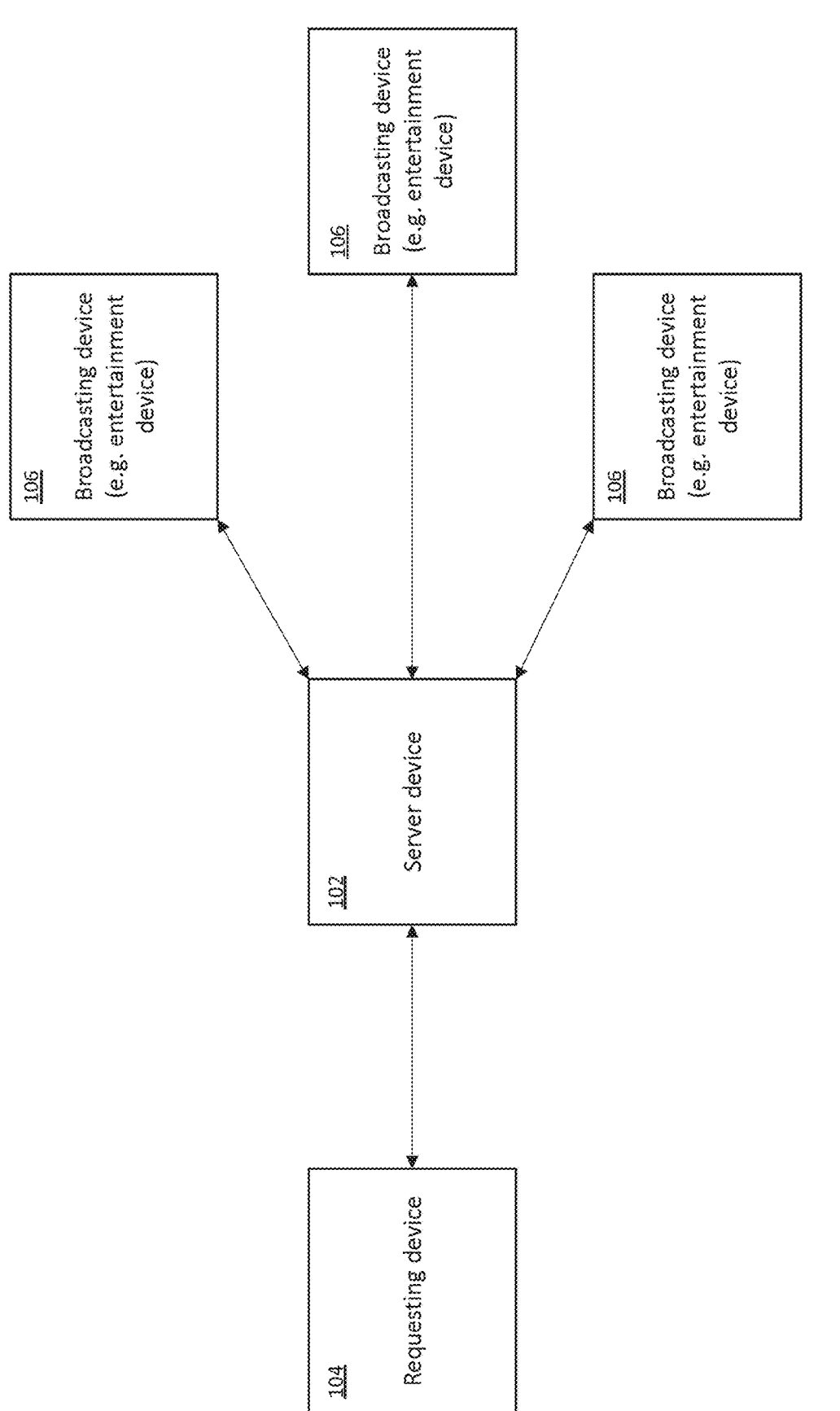
FIG. 1 schematically illustrates an example of a plurality of devices in communication with one another via a server device.

For clarity of illustration, elements illustrated in the figures have not necessarily been drawn to scale. Further, where considered appropriate, reference numerals have been repeated among the figures to indicate corresponding or analogous elements.

Methods and systems are disclosed for generating a stream recommendation. In the following description, a number of specific details are presented in order to provide a thorough understanding of the embodiments of the present technique. It will be apparent, however, to a person skilled in the art that these specific details need not be employed to practice the present technique. Conversely, specific details known to the person skilled in the art are omitted for the purposes of clarity where appropriate.

Several methods are described in this application. Note that each of these methods could be performed by a computer executing instructions of a computer program. Moreover, such a computer program may be stored on a computer-readable storage medium which may be a transitory storage medium or a non-transitory storage medium.

In the present application, the words "comprising at least one of . . . " are used to mean that any one of the following options or any combination of the following options is included. For example, "at least one of: A; B and C" is intended to mean A or B or C or any combination of A, B and C (e.g. A and B, or A and C, or B and C, or A and B and C).

FIG. 1 shows an example of a system for live streaming of video games. The system comprises a number of broadcasting devices 106, each of which is capable of generating and broadcasting a game stream. For example, each of the broadcasting devices 106 may be an entertainment device. The diagram shows three broadcasting devices 106, but it will be appreciated that there may be any number of broadcasting devices.

Each of the broadcasting devices 106 is arranged to communicate with a server device 102 (also referred to as a server). For example, the broadcasting devices may communicate with the server device 102 via the internet. The server 102 is arranged to receive, from each of the broadcasting devices 106, information about available game streams originating at each of these devices (e.g. each broadcasting device 106 may provide, to the server, information about whether they are currently broadcasting a game stream, or are capable of doing so).

The system also includes a requesting device 104. Only one requesting device 104 is shown in the figure, but it will be appreciated that further requesting devices may also be provided. The requesting device 104 (which could, for example, be a computer (e.g. a personal computer, PC), a mobile device such as a smartphone or tablet, or an entertainment device) is also arranged to communicate (for example, via the internet) with the server device 102. The requesting device 104 is arranged to send, to the server 102, requests relating to streaming of video game live streams. For example, the requesting device 104 could request access to a particular game stream. However, this would rely on the requester device 104 (or, more particularly, a user of the requester device 104) being aware of a particular game stream which they wish to view. In reality, while a given viewer may, in some situations, know of a particular stream that they wish to view (e.g. if they know that one or their friends is currently broadcasting a game stream), there may be situations where a user does not have this information. For example, this may be the case if the user wishes to view a game stream for a particular game, and none of their friends plays that game (or none of their friends broadcasts the game as they play it).

To address this problem, the system shown in FIG. 1 provides a mechanism for generating a stream recommendation, allowing a user of the requesting device to be recommended one or more available game streams to view. For example, the requesting device 104 may send, to the server 102, a request (referred to as a "stream-recommendation request") for the server to provide a stream recommendation. A stream recommendation may indicate at least a subset of available game streams that the requesting device 104 could stream from the broadcasting devices 106. After receiving the stream recommendation, a user of the requesting device 104 may select a game stream to begin streaming, and the broadcasting device 106 from which that stream originates may begin broadcasting the selected stream to the requesting device.

The broadcasting devices 106 may be arranged to broadcast their game streams to the requesting device 104 via the server 102, or they may broadcast directly (e.g. not via the server) to the requesting device 104.

Figure 2:
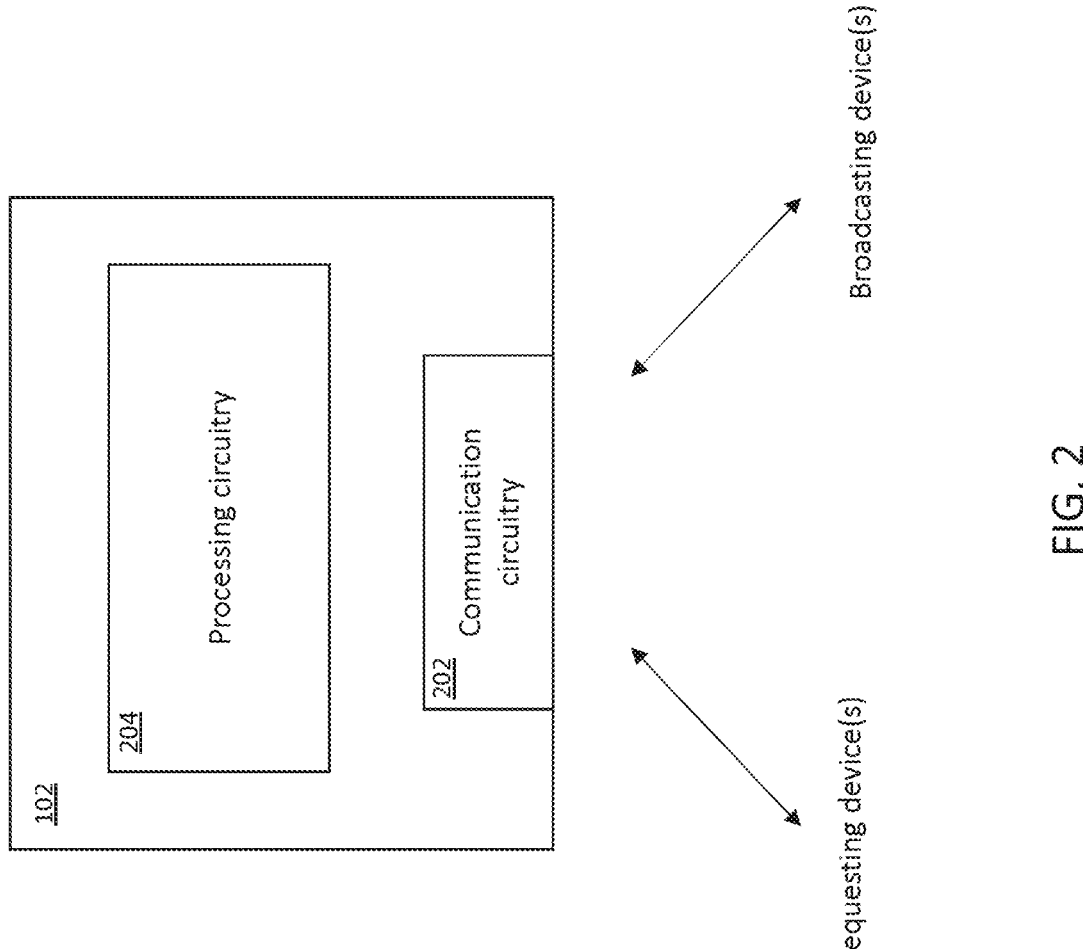
FIG. 2 schematically illustrates an example of a server device.

The server device 102 is illustrated in more detail in FIG. 2. As shown in the figure, the server device 102 may comprise communication circuitry 202 and processing circuitry 204. The communication circuitry 202 is arranged to communicate (e.g. via the internet) with each of the broadcasting devices 106 and each of the requesting devices 104. In particular, the communication circuitry 202 is arranged to receive stream-recommendation requests from the requesting device(s) 104-*a* stream-recommendation request indicates a request for a steam recommendation to be provided to the requesting device from which the request originated, and a stream recommendation comprises an indication of one or more available streams from which a user of the requesting device may select a stream to watch.

Accordingly, the communication circuitry 202 is an example of communication circuitry to receive, from a requesting device, a stream-recommendation request associated with a player profile.

The server device 102 also comprises processing circuitry 204, which is configured to generate the stream recommendation. More particularly, the processing circuitry 204 considers a player profile associated with the stream-recommendation request (e.g. this could be a player profile identified in the request, or it could be identified based on the requester device sending the request) and determines, based on the player profile, a number of available game streams to recommend to the user of the requester device. Hence, the processing circuitry 204 is an example of processing circuitry responsive to the stream-recommendation request to select, from a list of available game streams, one or more available game streams, and to generate a stream recommendation indicating the selected one or more available game streams.

Accordingly, the server device 102 is an example of an apparatus comprising: communication circuitry to receive, from a requesting device, a stream-recommendation request associated with a player profile; and processing circuitry responsive to the stream-recommendation request to select, from a list of available game streams, one or more available game streams, and to generate a stream recommendation indicating the selected one or more available game streams, wherein the processing circuitry is configured to select the one or more available game streams in dependence on the player profile.

Accordingly, the server device 102 of the present technique provides a stream recommendation which allows a user of a requesting device 104 to find a stream of a game, even if they do not know of a particular player from whom they could stream a game. Similarly, this allows the players generating the streams (e.g. the users of the broadcasting devices) to find viewers to stream their games to.

Figure 3:
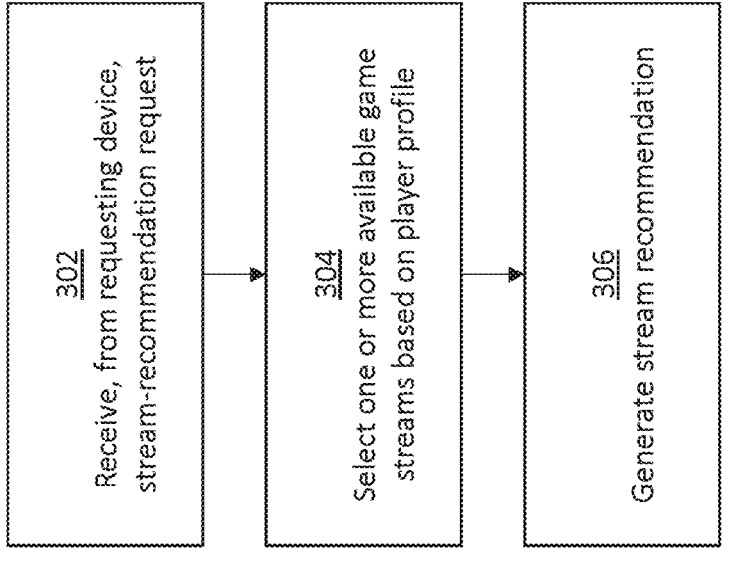
FIG. 3 is a flow diagram illustrating an example method for generating a stream recommendation.

FIG. 3 is a flow diagram showing an example of a method which may be performed by the server device 102. The method includes receiving 302, from a requesting device, a stream-recommendation request. For example, this request may be received by communication circuitry 202 of the server device 102, as discussed above. The method also includes a step 204 of selecting one or more available game streams based on a player profile associated with the stream-recommendation request. Further, the method also includes generating 306 a stream recommendation based on the selected game streams. Steps 304 and 306 could, for example, be performed by the processing circuitry 204 described above.

Accordingly, the flow diagram of FIG. 3 illustrates an example of a method comprising: receiving, from a requesting device, a stream-recommendation request associated with a player profile; and in response to the stream-recommendation request: selecting, from a list of available game streams, one or more available game streams, the one or more available game streams being selected in dependence on the player profile; and generating a stream recommendation indicating the selected one or more available game streams.

The method shown in FIG. 3 may, in some examples, be performed by a computer. For example, some examples of the present technique provide a computer program comprising instructions which, when executed on a computer, cause the computer to implement the above method. Further, some examples provide a computer-readable storage medium (which may be transitory or non-transitory) to store this computer program.

The method, computer program and computer-readable storage medium described above each provide the same advantages as the server device 102 illustrated in FIG. 2. In particular, they allow a stream recommendation to be provided, which allows a user of a requesting device 104 to find a stream of a game, even if they do not know of a particular player from whom they could stream a game. Similarly, the players generating the streams (e.g. the users of the broadcasting devices) are able to find viewers to stream their games to.

As noted above, the processing circuitry selects one or more available game streams to be included (identified) in the stream recommendation in dependence on a player profile associated with the request. For example, the player profile may be a profile of a user of the requesting device (for example, the profile could be a PSN® profile, or any other gaming profile associated with the user).

The way in which the player profile is used in the selection of available game streams may vary. For example, a user's gaming profile (e.g. their player profile) can be extended to allow them to indicate particular games they are interested in and may wish to view streams of from other players. The processing circuitry may then select the one or more available game streams (for inclusion in the stream recommendation) in dependence on game preferences indicated in the player profile.

Figure 4:
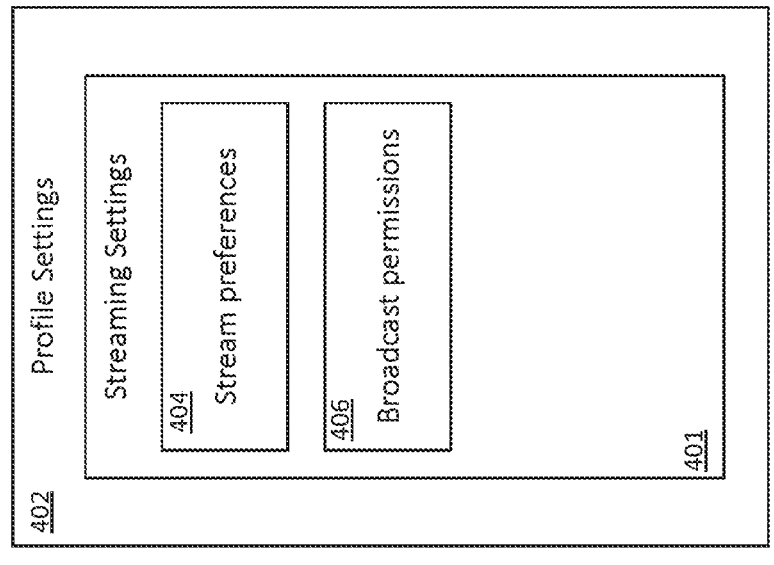
FIGS. 4 and 5 illustrate examples of how a user can set their streaming settings.
Figure 5:
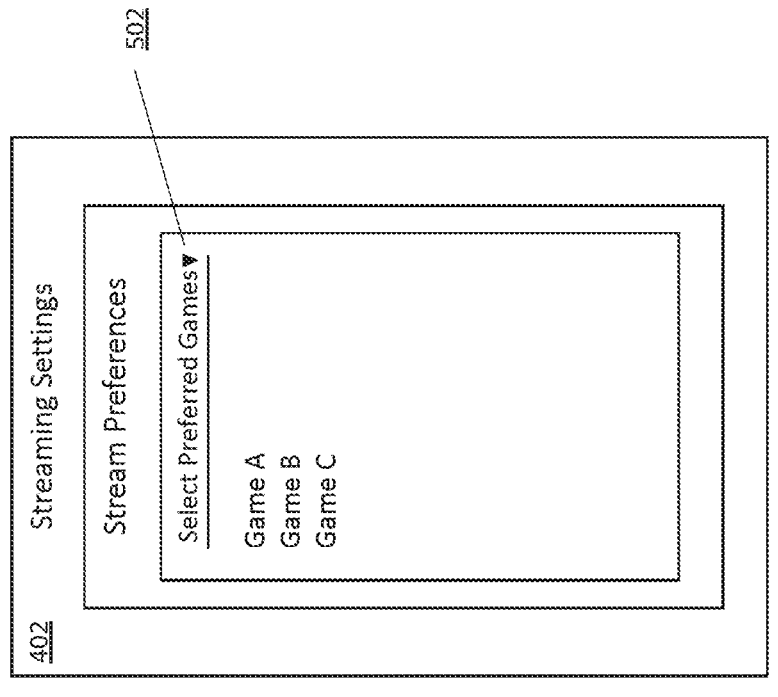

FIGS. 4 and 5 illustrate an example of how a player may indicate this information on their player profile. In particular, FIGS. 4 and 5 illustrate an example of a user interface (UI) 402 which may be displayed on a device (such as the requesting device) used by a user. The user interface 402 provides a mechanism for adjusting the user's player profile settings. For example, FIG. 4 shows an example of a "streaming settings" menu 401 which provides a user with options to modify their "stream preferences" 404 and their "broadcast permissions" 406. In this example, the "stream preferences" indicate a user's preferences in relation to the streaming of video game live streams from other players, while the "broadcasting permissions" indicate permissions set by the user in relation to the broadcasting of their own game play as video game streams. The stream preferences 404 can, therefore, be used to indicate factors to be taken into account by the processing circuitry of the server device when generating the stream recommendation.

For example, FIG. 5 shows an example of a display that may be provided after the user selects the stream preferences option 404. In this example, the user is shown a list of games that are already identified as games of interest/preferred games on their profile (i.e. "Game A", "Game B", "Game C"). A drop-down list is also provided, which allows the user to add or remove games from this list—for example, the user may tap or click on the arrow 502 to access the drop-down list, and may then be able to tap or click on games in the list to add or remove them from their list of games of interest.

Profile settings selected by the user using the profile settings UI 402 on their device are communicated to the server device. For example, an update may be sent to the server device periodically, or each time the settings are updated. The processing circuitry of the server device may then store, locally, information about the profile settings associated with the user's player profile, and access these when a stream-recommendation request identifying the user is received. Alternatively (or in addition), the selected stream preferences may be communicated to the server device with or as part of the stream-recommendation request. In either case, these stream preferences can then be used by the processing circuitry of the server device to generate the stream recommendation.

For example, where the stream preferences indicate a list of games of interest, the processing circuitry of the server device may select, as the available game streams to include in the stream recommendation, game streams corresponding to games indicated as games of interest by the user. The stream recommendation can then allow the user to find and view streams of a particular game they have indicated they have an interest in from players they do not (necessarily) know but who have given permission for their streams of that particular game to be shared.

The games of interest indicated by the user could also (or instead) be used in other ways when determining which available games streams to include in the stream recommendation. For example, the processing circuitry could select games in the same or a similar genre to one or more games indicated as games of interest, and/or games created by the same game developer as one or more games indicated as games of interest. In a particular example, the processing circuitry may be restricted to selecting game streams corresponding to games on the user's list of games of interest unless the number of available game streams in this category is below some threshold number (which could, in some examples, be set by the user), in which case additional game streams may be selected based on the genre and/or game designer as described above.

Moreover, selecting games of interest is just one way for a user to indicate game preferences. The user could instead (or in addition) be given the option to select particular game genres or game designers of interest. Alternatively, recommendations could be based on all of the games that a user owns or plays.

Another way in which the processing circuitry of the server device may use information from the player profile to select the game streams to include in the stream recommendation is based on the user's skill level in one or more games. For example, the processing circuitry may select game streams originating from players who are at a similar level to the user in the game they are broadcasting.

Moreover, while the above examples consider the user of either games of interest indicated by a user on their profile or the user's skill level, the processing circuitry may also be configured to use both of these factors when considering which game streams to include in the stream recommendation. Moreover, it will be appreciated that these are just two examples of the factors that could be considered, and other factors may also (or instead) be considered.

Figure 6:
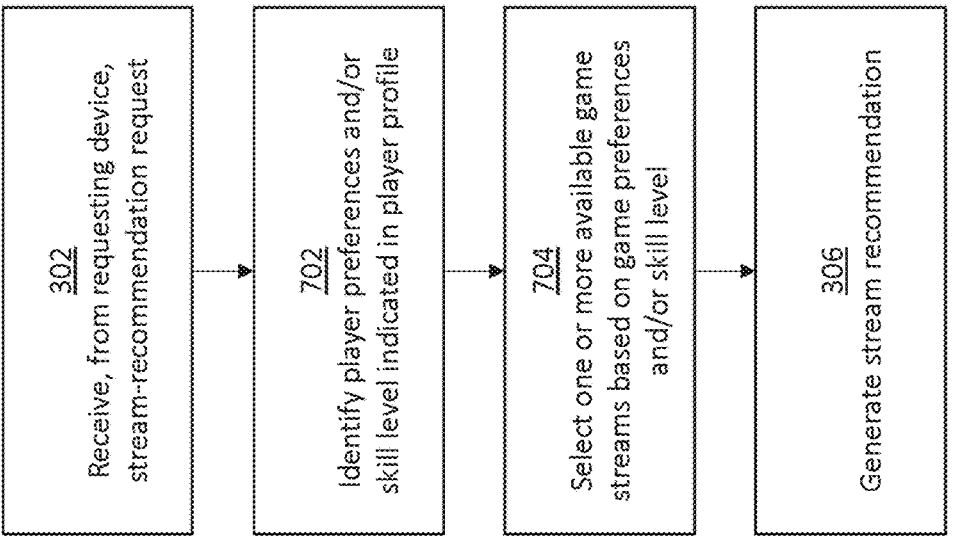
FIG. 6 is a flow diagram illustrating an example method for generating a stream recommendation.

FIG. 6 illustrates a particular example of a method for generating a stream recommendation, which takes into account the game preferences and/or skill level of a user. As shown in the method, a stream-recommendation request is received 302 from a requesting device. In a step 702, the game preferences and/or a skill level for the user are identified based on a player profile associated with the stream-recommendation request. The one or more available game streams to be included in the stream recommendation are then selected 704 based on the game preferences/skill level, and a stream recommendation is generated 306. In particular examples, step 302 may be performed by communication circuitry of the server device described above, while steps 702, 704 and 306 may be performed by processing circuitry of the server device.

Figure 7:
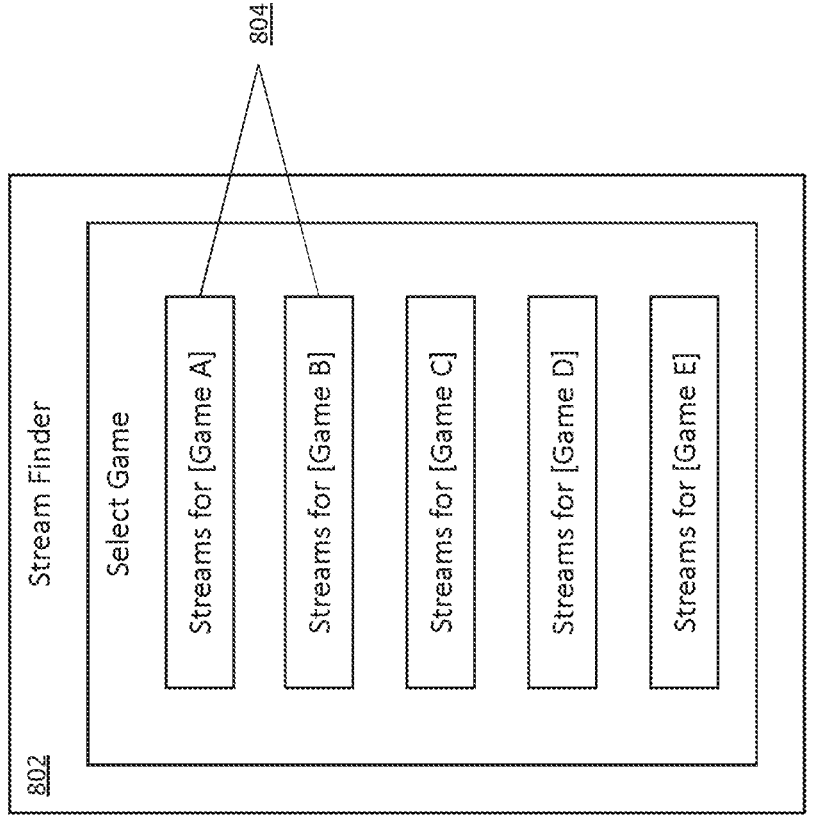
FIGS. 7 and 8 illustrate an example of how a stream-finder application can be used to choose a game stream.

Once the stream recommendation has been generated, it may be output (e.g. by the communication circuitry) for reception by the requesting device. A selection of one of the game streams identified in the stream recommendations may then be made (e.g. by the user of the requesting device) and communicated to the server device. An example of how the stream recommendation may, once received by the requesting device, by presented to the user is shown in FIG. 7. In particular, FIG. 7 illustrates an example of a user interface (UI) 802 of a stream finder application. The stream finder application may display a list of the available game streams included in the stream recommendation, such that the user can select one of the streams to view. In the particular example of FIG. 7, the available game streams are grouped by game—the user can tap or click on one of the games 804 in the list to see a list of the available game streams for that game.

Figure 8:
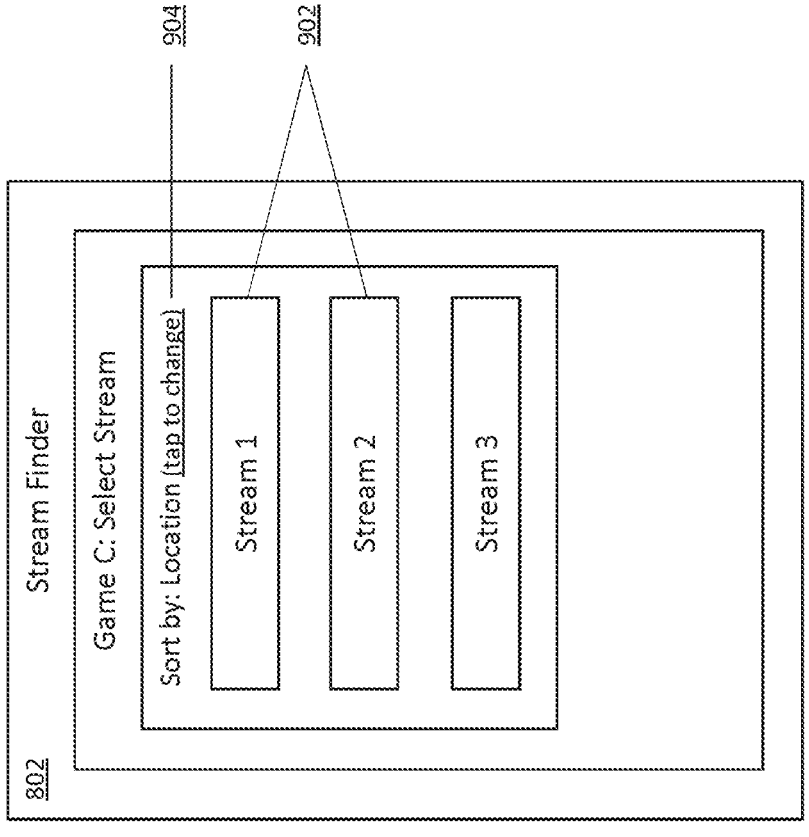

FIG. 8 shows an example of a list of available game streams 902 that might be shown if the user selects "Game C" from the list shown in FIG. 7. Where a large number of streams have been selected for inclusion in the stream recommendation, it can be helpful to sort the game streams based on one or more parameters or categories. For example, game streams may be sorted based on categories (e.g. based on geographical location or skill level of the broadcasting player) indicated for each of the game streams. For example, FIG. 8 shows how the available game streams 902 for Game C could be sorted based on location (e.g. this could be based on distance between a location (e.g. country) of the broadcasting device and a location of the streaming device). Moreover, as shown in FIG. 8, an option 904 may be provided to allow the user to change the way in which the streams are sorted. For example, the user could be given the option to sort the game streams by skill level, popularity of the streamer, number of viewers currently watching the stream, time since the stream began broadcasting, or any other factor.

Figure 9:
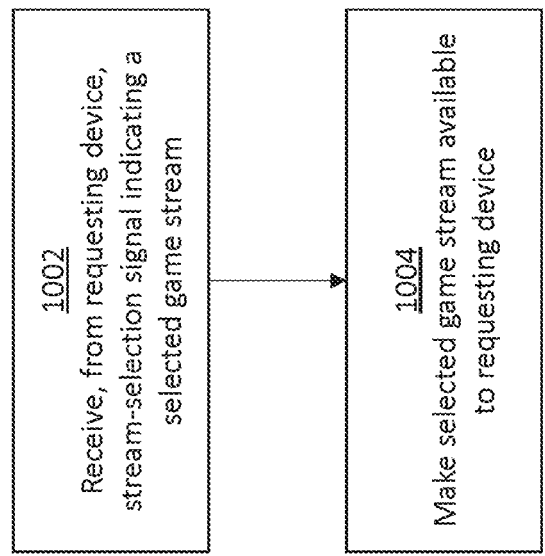
FIGS. 9 and 10 are flow diagrams illustrating example methods for providing a game stream to a requesting device.

However the UI 802 of the stream finder app is arranged, the selection of a stream by the user causes a stream-selection signal to be communicated to the server device. FIG. 9 shows an example of a method that may be performed in response to communication of the stream-finder signal. In particular, the method includes a step 1002, in which the stream-selection signal is received. The stream-selection signal indicates a selected game stream to be made available to the requesting device. In response to the stream-selection signal being received, the selected game stream is then made available 1004 to the requesting device.

To save network resources, broadcasting of one player's game to another may only be started when at least one other user indicates they wish the game to be streamed to them. For example, even if a game stream is identified as an available game stream, the broadcasting device may not actually begin broadcasting the game until a requesting device requests to view the stream. This addresses potential bandwidth wastage problems in which one user may start streaming despite there being no users actually viewing the stream.

Figure 10:
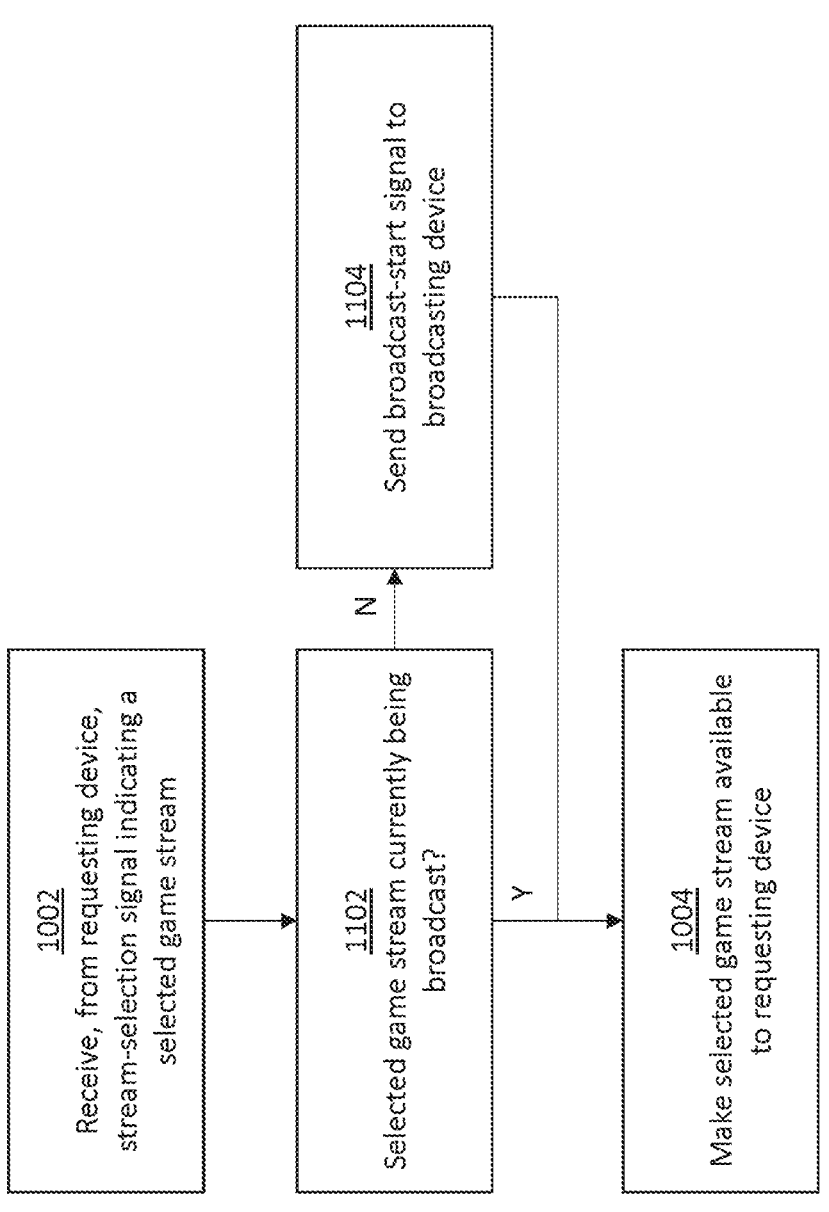

For example, FIG. 10 shows another example of a method which may be performed in response to a stream-selection signal being sent. In this method, the stream-selection signal is received 1002, and in response it is determined 1102 whether the selected game stream is currently being broadcast. If it is determined that the selected game stream is currently being broadcast ("Y" arrow), the selected game stream is made available 1004 to the requesting device. On the other hand, if the selected game stream is not currently being broadcast ("N" arrow), a broadcast-start signal is sent 1104 to the broadcasting device, to cause the broadcasting device to begin broadcasting the stream. The selected game stream can then be made available 1004 to the requesting device.

When a game stream is being broadcast from a broadcasting device to a requesting device, it can be useful to obscure at least some details of the player profile of each of the broadcasting player and the streaming player. For example, to maintain the security of either user, any identifying details (e.g. any details other than their profile username) can be hidden.

However, users may still wish to be able to connect with one another—e.g. the streaming user may wish to send a connection request (also referred to herein as a friend request) to connect with the broadcasting player, or vice versa. Hence, in some examples, users can receive requests to connect, which they can accept or reject. This allows users to make new friends in the gaming world based on similar gaming interests, but also allows control and privacy to be maintained by the streaming user.

Figure 11:
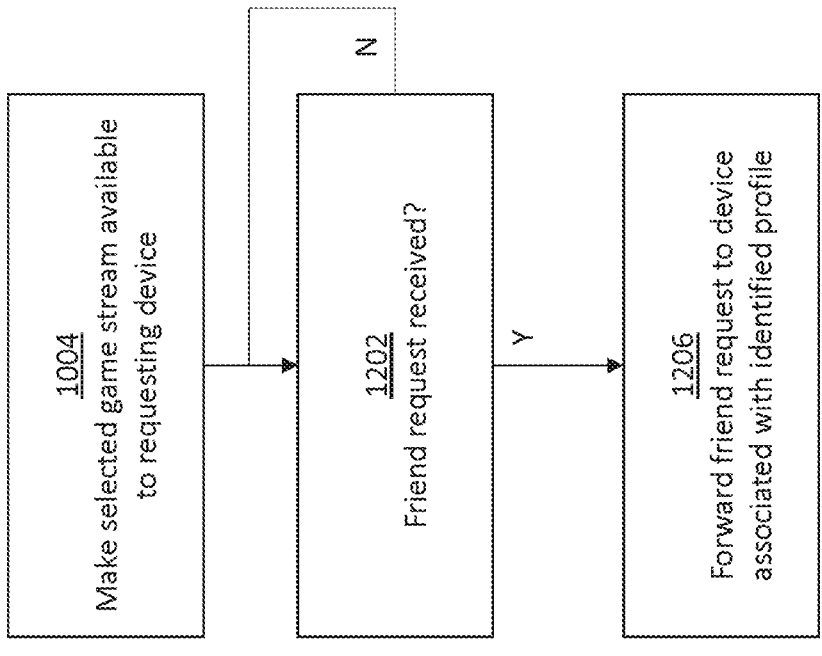
FIG. 11 is a flow diagram illustrating an example method for handling a friend request.

FIG. 11 shows an example of how these connection requests could be handled by the server device. The method starts with making the selected game stream available 1004 to the requesting device. After streaming of the requested game stream has begun, it is determined 1202 whether a friend request has been received. The friend request can originate from the requesting device or the broadcasting device, and identifies (either explicitly or implicitly) the player associated with the other of these devices (e.g. a request from the requesting device may identify the player associated with the broadcasting device, and vice versa). Once a friend request has been received by the server device, it is forwarded 1206 to the device associated with the identified player.

Another way in which a broadcasting player and a streaming player may interact could be by participating in a two-way stream. For example, if a broadcasting player has difficulties against certain boss, a member of the audience could offer to show the streamer how to beat the boss briefly on their "audience member own stream". The audience member's own gameplay could then temporarily be shared with the audience of the original stream, creating a two-way stream.

Figure 12:
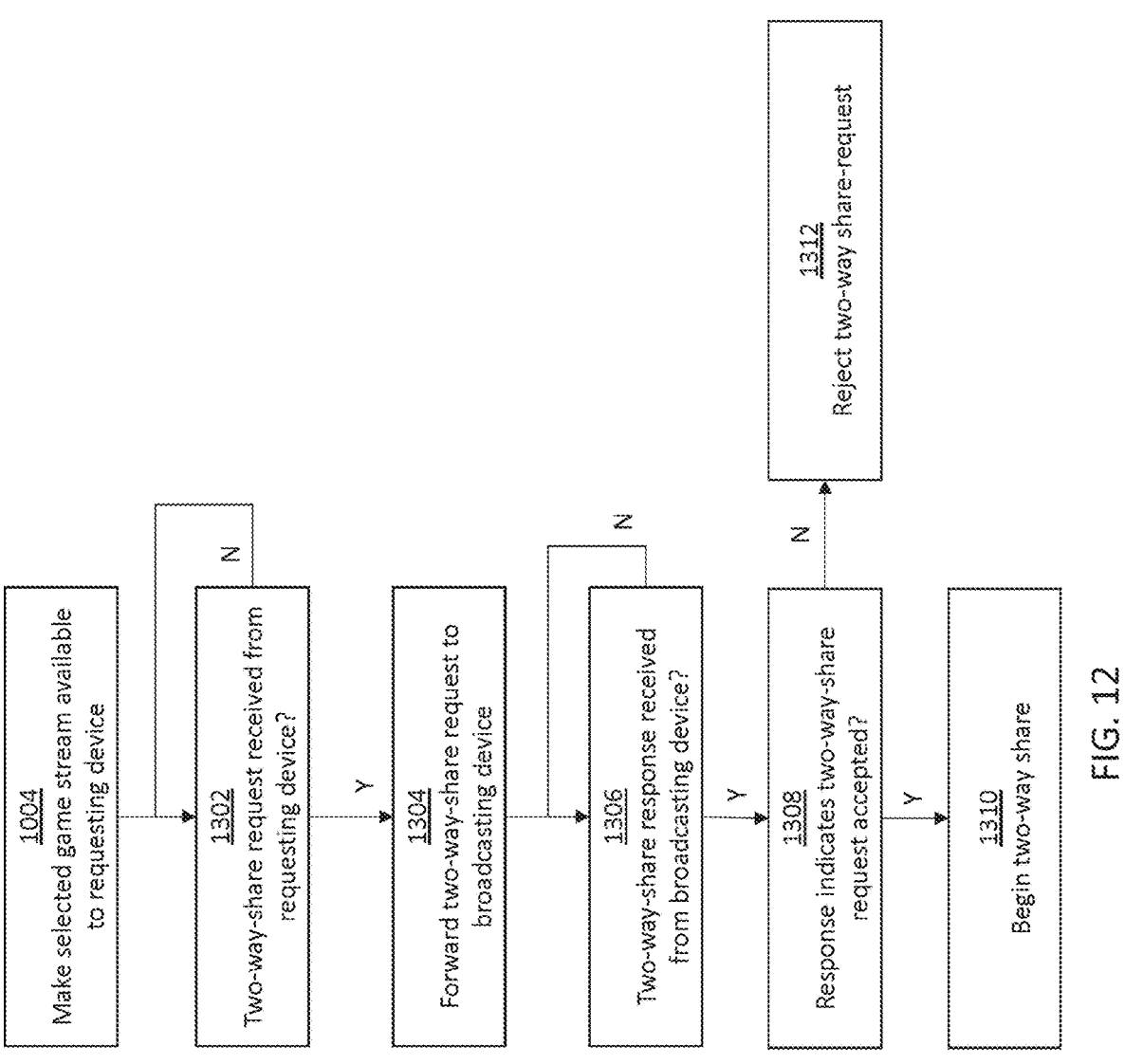
FIG. 12 is a flow diagram illustrating an example of a method for handling a two-way-share request.

FIG. 12 shows an example method of generating a two-way stream. The method begins with a step 1004 of making the selected game stream available to the requesting device. During streaming of the selected game stream, it is determined 1302 (e.g. by the processing circuitry of the server device) whether a two-way-share request has been received from the requesting device. When ("Y" branch) it is determined that a two-way-share request has been received from the requesting device, this request is forwarded 1304 to the broadcasting device. The method then involves waiting 1306 for a two-way-share response (indicating whether or not the two-way-share request has been accepted by the broadcasting device) to be received from the broadcasting device. Once ("Y" branch) this response is received, it is determined 1308 whether the response indicates that the request has been accepted. If the response has been accepted ("Y" branch), the two-way share is begun 1310, whereas if the response has been rejected ("N" branch), the two-way-share request is rejected 1312.

In the above example, providing a mechanism to allow two players to participate in a two-way share enables greater collaboration in the creation of media content, even when the two players involved are in separate geographical locations. Moreover, while the above example primarily considers a two-way share, it will be appreciated that this could also be extended to a multi-way share in which more than two players can participate. For example, once a two-way share has begun, the involved players may receive a further two-way-share request from another view, and may accept this request to initiate a three-way share.

Figure 13:
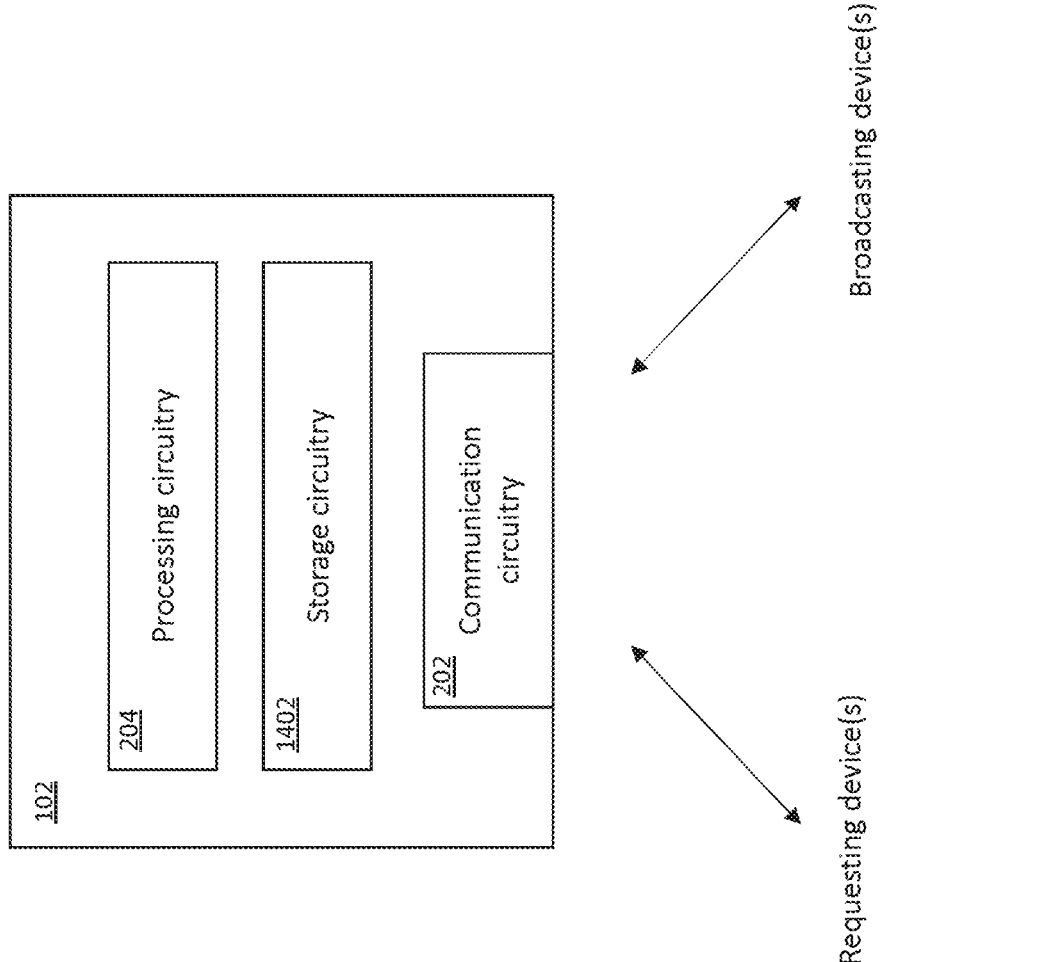
FIG. 13 schematically illustrates an example of a server device.

In some situations, it can be helpful to be able to store a game stream so that it can be watched again later. This may include game streams including a two-way share. FIG. 13 illustrates an example of how the server device 102 could be arranged to facilitate this.

As shown in FIG. 13, the server device 102 could include storage circuitry 1402, which can be used to store game streams. For example, the communication circuitry 202 may receive a stream-record request (e.g. from a requesting device or from a broadcasting device) to record at least a portion of a selected stream. The processing circuitry 204 may be responsive to the stream-request to record at least the portion of the selected stream, and to store the recorded portion of the selected stream to the storage circuitry. In this way, the game stream—which could include a two-way share, as described above—can be stored for later use.

Figure 14:
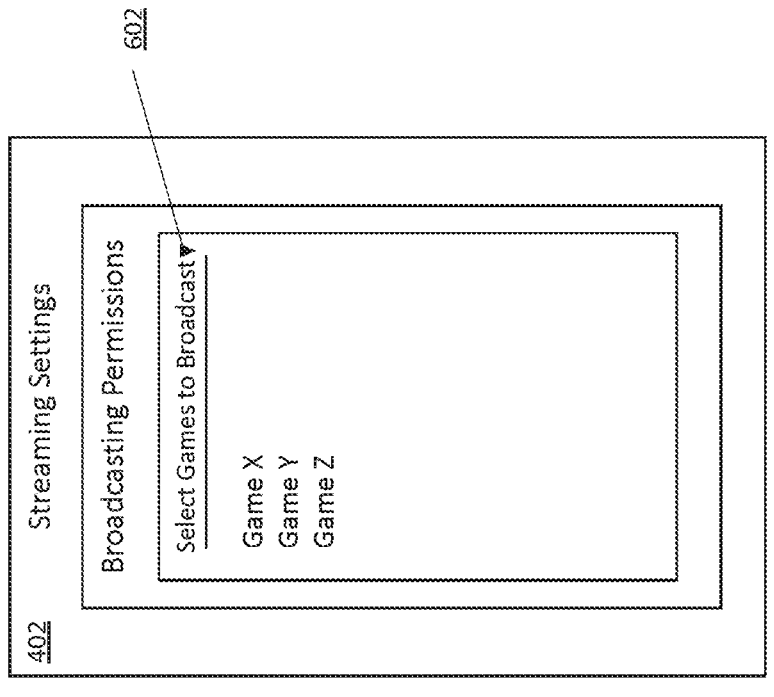
FIG. 14 illustrates an example of how a user can set their broadcasting permissions.

Returning to the "profile settings UI" 402 shown in FIG. 4, it is noted that a user may also (in addition to setting their stream preferences) set broadcast permissions using this UI. For example, the user may select the "broadcast permissions" option 406, which may take them to the menu shown in FIG. 14. This screen shows a list of games ("Game X", "Game Y", "Game Z"), selected by the user, for which automatic broadcasting is permitted. The screen also has a drop-down menu (accessible by tapping or clicking on the arrow 602), which allows the user to add or remove games from the list.

The example described above assumes that each game is assigned one of two permission levels: (1) automatic broadcasting of this game is not permitted; and (2) broadcasting of this game is permitted to begin automatically once I begin playing this game. Allowing the user to indicate permission level 2 (automatic broadcasting) for at least some games can be advantageous, since it allows broadcasting of these games to begin automatically once the user starts playing. This avoids the need for the user to manually start the broadcast for each of these games every time they wish to play. Moreover, providing the option to select permission level 1 (no broadcasting) for some games gives the user the ability to keep some games private, if they wish to. Of course, it will be appreciated that further permission levels may also be defined, in addition to the permission levels described above.

Figure 15:
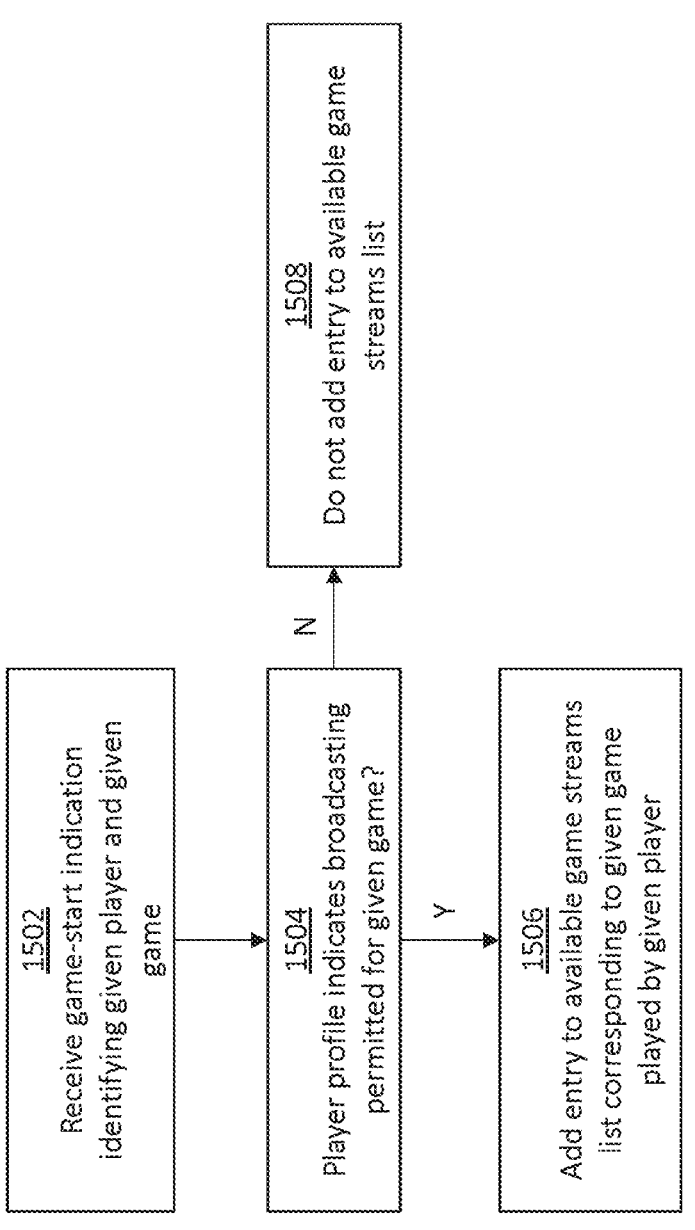
FIG. 15 is a flow diagram illustrating an example method for adding an entry to a list of available game streams.

FIG. 15 is a flow diagram illustrating an example method for determining, automatically, whether or not to broadcast a player's game, using permissions indicated on the player's profile. The method includes a step 1502 of receiving (e.g. at the server device) a game-start indication, indicating that given player has begun playing a given game. For example, the game-start indication may identify both the given player and the given game. The method also includes determining 1504 whether a player profile associated with the given player indicates that broadcasting is permitted for the given game. If it is determined that broadcasting is permitted ("Y" branch), an entry is added 1506 to the list of available game streams, corresponding to the given game being played by the given player. Note that while it is possible, in some examples, for broadcasting of the game stream to begin at this point, in other examples (as described above), broadcasting may not begin until a requesting device indicates that the game stream is selected for viewing by a user of the requesting device. On the other hand, if the player profile indicates that broadcasting is not permitted for the given game ("N" branch), a corresponding entry is not added 1508.

As noted above, the arrangements of the requesting device and the broadcasting device are not particularly limited. However, in some examples the broadcasting device and/or the requesting device may comprise an entertainment device.

Figure 16:
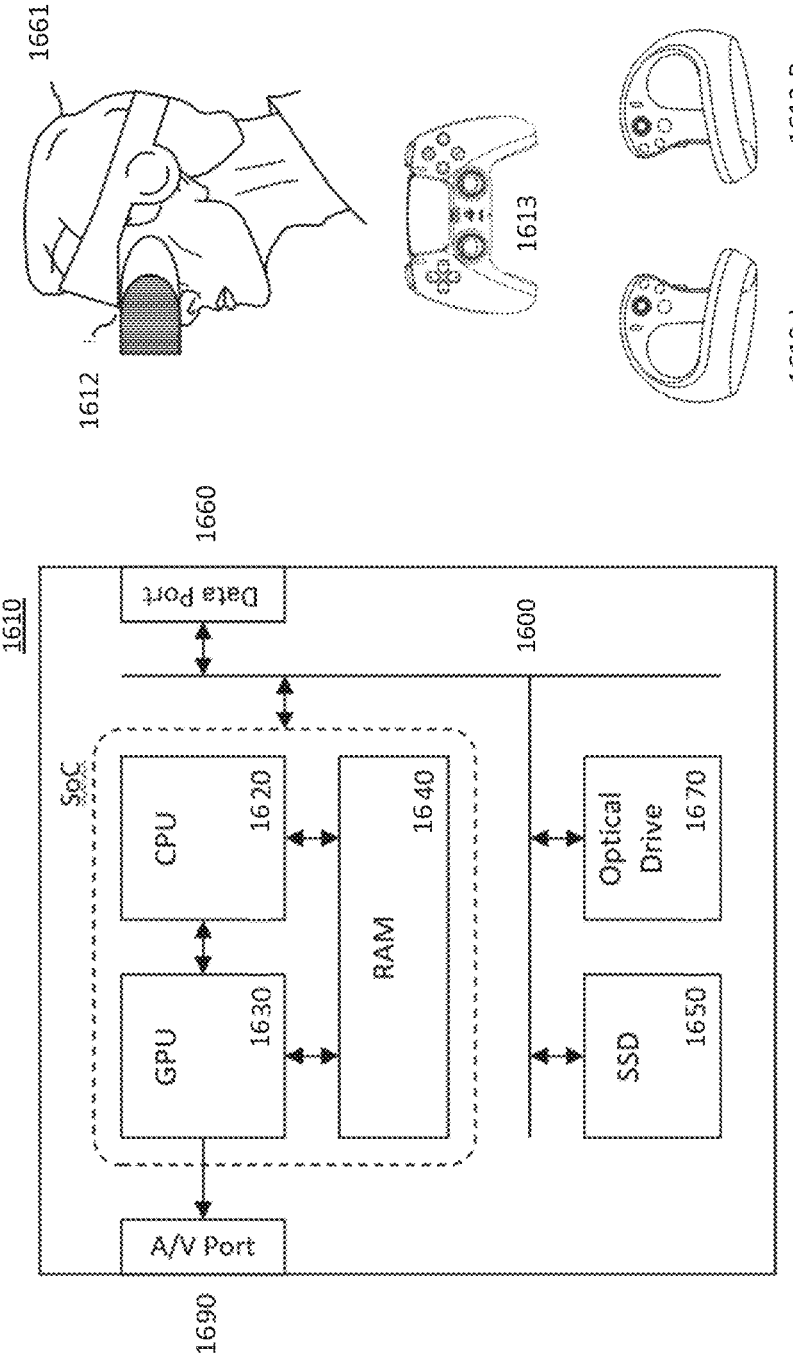
FIG. 16 schematically illustrates an example of an entertainment device.

FIG. 16 shows an example of an entertainment system 1610, which may be a computer or console such as the Sony® PlayStation 5® (PS5).

The entertainment system 1610 comprises a central processor 1620. This may be a single or multi core processor, for example comprising eight cores as in the PS5. The entertainment system also comprises a graphical processing unit or GPU 1630. The GPU can be physically separate to the CPU, or integrated with the CPU as a system on a chip (SoC) as in the PS5.

The entertainment device also comprises RAM 1640, and may either have separate RAM for each of the CPU and GPU, or shared RAM as in the PS5. The or each RAM can be physically separate, or integrated as part of an SoC as in the PS5. Further storage is provided by a disk 1650, either as an external or internal hard drive, or as an external solid state drive, or an internal solid state drive as in the PS5.

The entertainment device may transmit or receive data via one or more data ports 1660, such as a USB port, Ethernet® port, Wi-Fi® port, Bluetooth® port or similar, as appropriate. It may also optionally receive data via an optical drive 1670.

Audio/visual outputs from the entertainment device are typically provided through one or more A/V ports 1690, or through one or more of the wired or wireless data ports 1660.

An example of a device for displaying images output by the entertainment system is a head mounted display 'HMD' 1612, such as the PlayStation VR 2 'PSVR2', worn by a user 1661.

Where components are not integrated, they may be connected as appropriate either by a dedicated data link or via a bus 1600.

Interaction with the system is typically provided using one or more handheld controllers (1613, 1613A), such as the DualSense® controller (1613) in the case of the PS5, and/or one or more VR controllers (1613A-L,R) in the case of the HMD.

In the examples described above, a user can receive a stream recommendation suggesting a number of game streams that are available for the user to view. This recommendation is generated in dependence on the user's profile, to provide a tailored experience and to connect the user with broadcasters which they may not have found otherwise. From the broadcaster's perspective, examples of the present technique allow them to automatically broadcast some or all of their games as they start playing, allowing them to grow their audience or connect with new friends with case.

Example(s) of the present technique are defined by the following numbered clauses:

1. An apparatus comprising: communication circuitry to receive, from a requesting device, a stream-recommendation request associated with a player profile; and processing circuitry responsive to the stream-recommendation request to select, from a list of available game streams, one or more available game streams, and to generate a stream recommendation indicating the selected one or more available game streams, wherein the processing circuitry is configured to select the one or more available game streams in dependence on the player profile.

2. The apparatus of clause 1, wherein the processing circuitry is configured to select the one or more available game streams in dependence on game preferences indicated in the player profile.

3. The apparatus of clause 2, wherein the game preferences identify one or more games of interest selected by a player associated with the player profile.

4. The apparatus of any preceding clause, wherein the processing circuitry is configured to select the one or more available game streams in dependence on a skill level indicated, for at least one identified game, on the payer profile.

5. The apparatus of any preceding clause, wherein: the communication circuitry is configured to output the stream-recommendation to the requesting device and to receive, from the requesting device, a stream-selection signal indicative of a selected game stream of the one or more available game streams indicated by the stream recommendation; and the processing circuitry is responsive to the stream-selection signal to make the selected game stream available to the requesting device.

6. The apparatus of clause 5, wherein: the processing circuitry is responsive to the stream-selection signal to: determine whether a broadcast of the selected game stream has begun; and in response to determining that the broadcast of the selected game stream has not begun, send a broadcast-start signal to a broadcasting device from which the selected game stream is broadcast, wherein the broadcast-start signal comprises a request to begin broadcasting the selected game stream.

7. The apparatus of clause 5 or clause 6, wherein the processing circuitry is configured to prevent, when making the selected game stream available to the requesting device, at least a portion of the player profile from being revealed to a broadcasting device from which the selected game stream is broadcast.

8. The apparatus of clause 7, wherein: the communication circuitry is configured to receive, from one of the requesting device and the broadcasting device, a friend request indicating a request for to connect a streaming player associated with the requesting device with a broadcasting player associated with the broadcasting device; and the communication circuitry is responsive to receiving the friend request to forward the friend request to the other of the requesting device and the broadcasting device.

9. The apparatus of any of clauses 5 to 8, wherein: the communication circuitry is configured to receive, from the requesting device, a two-way-share request indicating a request to include, in the selected game stream, an additional game stream associated with a streaming player, the streaming player being associated with the requesting device; and the communication circuitry is responsive to the two-way-share request to forward the two-way share request to a broadcasting device from which the selected game stream is broadcast.

10. The apparatus of any of clauses 5 to 9, wherein the processing circuitry is responsive to a stream-record request to record at least a portion of the selected stream and to store the recorded portion of the selected stream to storage circuitry.

11. The apparatus of any preceding clause, wherein: the communication circuitry is configured to receive a game-start indication identifying a given player and a given game being played by the given player, the game-start indication indicating that the given player has begun playing the given game; the processing circuitry is responsive to the game-start indication being received to determine whether a given player profile associated with the given player indicates that broadcasting is permitted for the given game; and the processing circuitry is configured to add, in response to determining that the given player profile indicates that broadcasting is permitted for the given game, a corresponding game stream to the list of available streams.

12. The apparatus of any preceding clause, wherein: the processing circuitry is configured to select, for each of the one or more available game streams, at least one category; and the processing circuitry is configured to indicate, in the stream recommendation, the at least one category selected for each game stream.

13. The apparatus of clause 12, wherein the processing circuitry is configured to select the at least one category in dependence on at least one of: a geographical location of a broadcasting device from which the game stream is to be broadcast; and a skill level of a broadcasting player associated with the broadcasting device.

14. A method comprising: receiving, from a requesting device, a stream-recommendation request associated with a player profile; and in response to the stream-recommendation request: selecting, from a list of available game streams, one or more available game streams, the one or more available game streams being selected in dependence on the player profile; and generating a stream recommendation indicating the selected one or more available game streams.

15. A computer program comprising instructions which, when executed on a computer, cause the computer to implement the method of clause 14.

16. A computer-readable storage medium to store the computer program of clause 15.

The invention claimed is:

1. An apparatus comprising:
processing circuitry configured to:
  receive, from a requesting device, a stream-recommendation request associated with a player profile;
  in response to the stream-recommendation request, select one or more available game streams from a list of available game streams in dependence on the player profile;
  generate a stream recommendation indicating the selected one or more available game streams;
  output the stream recommendation to the requesting device in response to the stream-recommendation request;
  receive, from the requesting device, a stream-selection signal indicative of a selected game stream of the one or more available game streams;
  make the selected game stream available to the requesting device in response to the stream-selection signal; and
  prevent, when making the selected game stream available to the requesting device, at least a portion of the player profile from being revealed to a broadcasting device from which the selected game stream is broadcast.

2. The apparatus of claim 1, wherein the processing circuitry is configured to select the one or more available game streams in dependence on game preferences indicated in the player profile.

3. The apparatus of claim 2, wherein the game preferences identify one or more games of interest selected by a player associated with the player profile.

4. The apparatus of claim 1, wherein the processing circuitry is configured to select the one or more available game streams in dependence on a skill level indicated, for at least one identified game, on the player profile.

5. The apparatus of claim 1, wherein:
the processing circuitry is responsive to the stream-selection signal to:
  determine whether a broadcast of the selected game stream has begun; and
  in response to determining that the broadcast of the selected game stream has not begun, send a broadcast-start signal to the broadcasting device from which the selected game stream is broadcast,
wherein the broadcast-start signal comprises a request to begin broadcasting the selected game stream.

6. The apparatus of claim 1, wherein the processing circuitry is configured to:
  receive, from one of the requesting device and the broadcasting device, a friend request indicating a request for to connect a streaming player associated with the requesting device with a broadcasting player associated with the broadcasting device; and
  forward, responsive to receiving the friend request, the friend request to the other of the requesting device and the broadcasting device.

7. The apparatus of claim 1, wherein the processing circuitry is configured to:
  receive, from the requesting device, a two-way-share request indicating a request to include, in the selected game stream, an additional game stream associated with a streaming player, the streaming player being associated with the requesting device; and
  forward, responsive to the two-way-share request, two-way-share request to the broadcasting device from which the selected game stream is broadcast.

8. The apparatus of claim 1, wherein the processing circuitry is responsive to a stream-record request to record at least a portion of the selected game stream and to store the recorded portion of the selected game stream to storage circuitry.

9. The apparatus of claim 1, wherein:

the processing circuitry is configured to receive a game-start indication identifying a given player and a given game being played by the given player, the game-start indication indicating that the given player has begun playing the given game;

the processing circuitry is responsive to the game-start indication being received to determine whether a given player profile associated with the given player indicates that broadcasting is permitted for the given game; and the processing circuitry is configured to add, in response to determining that the given player profile indicates that broadcasting is permitted for the given game, a corresponding game stream to the list of available streams.

10. The apparatus of claim 1, wherein:

the processing circuitry is configured to select, for each of the one or more available game streams, at least one category; and the processing circuitry is configured to indicate, in the stream recommendation, the at least one category selected for each game stream.

11. The apparatus of claim 10, wherein the processing circuitry is configured to select the at least one category in dependence on at least one of:

a geographical location of the broadcasting device from which the game stream is to be broadcast; and a skill level of a broadcasting player associated with the broadcasting device.

12. A method comprising:

receiving, from a requesting device, a stream-recommendation request associated with a player profile;

in response to the stream-recommendation request:

selecting one or more available game streams from a list of available game streams in dependence on the player profile;

generating a stream recommendation indicating the selected one or more available game streams; and outputting the stream-recommendation to the requesting device;

receiving, from the requesting device, a stream-selection signal indicative of a selected game stream of the one or more available game streams;

making the selected game stream available to the requesting device in response to the stream-selection signal; and preventing, when making the selected game stream available to the requesting device, at least a portion of the player profile from being revealed to a broadcasting device from which the selected game stream is broadcast.

13. A non-transitory computer-readable storage medium storing a computer program comprising instructions which, when executed on a computer, cause the computer to implement a method comprising:

receiving, from a requesting device, a stream-recommendation request associated with a player profile;

in response to the stream-recommendation request:

selecting one or more available game streams from a list of available game streams in dependence on the player profile;

generating a stream recommendation indicating the selected one or more available game streams; and outputting the stream-recommendation to the requesting device;

receiving, from the requesting device, a stream-selection signal indicative of a selected game stream of the one or more available game streams;

making the selected game stream available to the requesting device in response to the stream-selection signal; and preventing, when making the selected game stream available to the requesting device, at least a portion of the player profile from being revealed to a broadcasting device from which the selected game stream is broadcast.

14. The method of claim 12, further comprising:

selecting the one or more available game streams in dependence on game preferences indicated in the player profile.

15. The method of claim 14, wherein the game preferences identify one or more games of interest selected by a player associated with the player profile.

16. The method of claim 12, further comprising:

selecting the one or more available game streams in dependence on a skill level indicated, for at least one identified game, on the player profile.

17. The method of claim 12, further comprising:

determining whether a broadcast of the selected game stream has begun responsive to the stream-selection signal; and upon determining that the broadcast of the selected game stream has not begun, sending a broadcast-start signal to the broadcasting device from which the selected game stream is broadcast.

18. The method of claim 12, further comprising:

receiving, from one of the requesting device and the broadcasting device, a friend request indicating a request for to connect a streaming player associated with the requesting device with a broadcasting player associated with the broadcasting device; and upon receiving the friend request, forwarding the friend request to the other of the requesting device and the broadcasting device.

19. The method of claim 12, further comprising:

receiving, from the requesting device, a two-way-share request indicating a request to include, in the selected game stream, an additional game stream associated with a streaming player, the streaming player being associated with the requesting device; and responsive to the two-way-share request, forwarding the two-way-share request to the broadcasting device from which the selected game stream is broadcast.

20. The method of claim 12, further comprising:

responsive to a stream-record request, recording at least a portion of the selected game stream and to store the recorded portion of the selected game stream to storage circuitry.

* * * * *